US005483678A

United States Patent [19]

Abe

[11] Patent Number: 5,483,678

[45] Date of Patent: Jan. 9, 1996

[54] INTERNAL MICROSTRIP ANTENNA FOR RADIO TELEPHONES

[75] Inventor: Takashi Abe, Sendai, Japan

[73] Assignee: Fujitsu Limited, Kawasaki, Japan

[21] Appl. No.: 208,798

[22] Filed: Mar. 9, 1994

Related U.S. Application Data

[63] Continuation of Ser. No. 952,351, Sep. 28, 1992, abandoned.

[51] Int. Cl.[6] .......... H04B 1/46

[52] U.S. Cl. .......... 455/80; 455/82; 455/89; 455/129; 455/280; 333/246; 343/700 MS; 343/702

[58] Field of Search .......... 455/78, 79, 80, 455/87, 83, 86, 89, 129, 280; 333/246; 343/700 MS, 702, 786; 29/830

[56] References Cited

U.S. PATENT DOCUMENTS

| | | | |
|---|---|---|---|
| 4,788,766 | 12/1988 | Burger et al. | 29/830 |
| 4,792,939 | 12/1988 | Hikita et al. | 455/86 |
| 5,019,829 | 5/1991 | Heckman et al. | 343/700 MS |
| 5,023,624 | 6/1991 | Heckaman | 343/786 X |

*Primary Examiner*—Edward F. Urban
*Assistant Examiner*—Philip J. Sobutka
*Attorney, Agent, or Firm*—Greer, Burns & Crain, Ltd.

[57] ABSTRACT

An antenna suitable for a radio telephone which is primarily comprised of a duplexer, a transmitter, and a receiver. The antenna is fabricated as a cover for sealing a box-like duplexer. At the same time, the cover is set up by a microstrip antenna which is comprised of a dielectric substrate and conductive pattern layers formed on the top and bottom surfaces of the dielectric substrate.

6 Claims, 7 Drawing Sheets

INTERNAL MICROSTRIP ANTENNA FOR RADIO TELEPHONES

RELATED APPLICATION

This is a continuation of application Ser. No. 07/952,351, filed on Sep. 28, 1992, now abandoned.

BACKGROUND OF THE INVENTION

1. Field of the Invention

The present invention relates to an antenna used for a radio telephone.

A radio telephone is a telephone set using a radio link instead of a cable and is mainly comprised of a transmitter, receiver, antenna, and other necessary equipment.

2. Description of the Related Art

A radio telephone is usually equipped with a rod-type antenna. The rod-type antenna necessarily projects from the body of the radio telephone. This projection of the rod-type antenna becomes a hindrance to the person carrying the telephone.

Further such a rod-type antenna is easily broken if the radio telephone is dropped accidentally.

SUMMARY OF THE INVENTION

Therefore, the present invention, in view of the above problems, has as its object the provision of a radio telephone having an antenna which does not become a hindrance to the person carrying the telephone, and further which is hard to break even if the telephone is dropped accidentally.

To attain the above object, the antenna is realized by a microstrip antenna formed as a cover sealing a box-like transmission-reception filter package, i.e., so-called duplexer.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the prior art and the problems therein will be first described with reference to the related figures.

Figure 1:
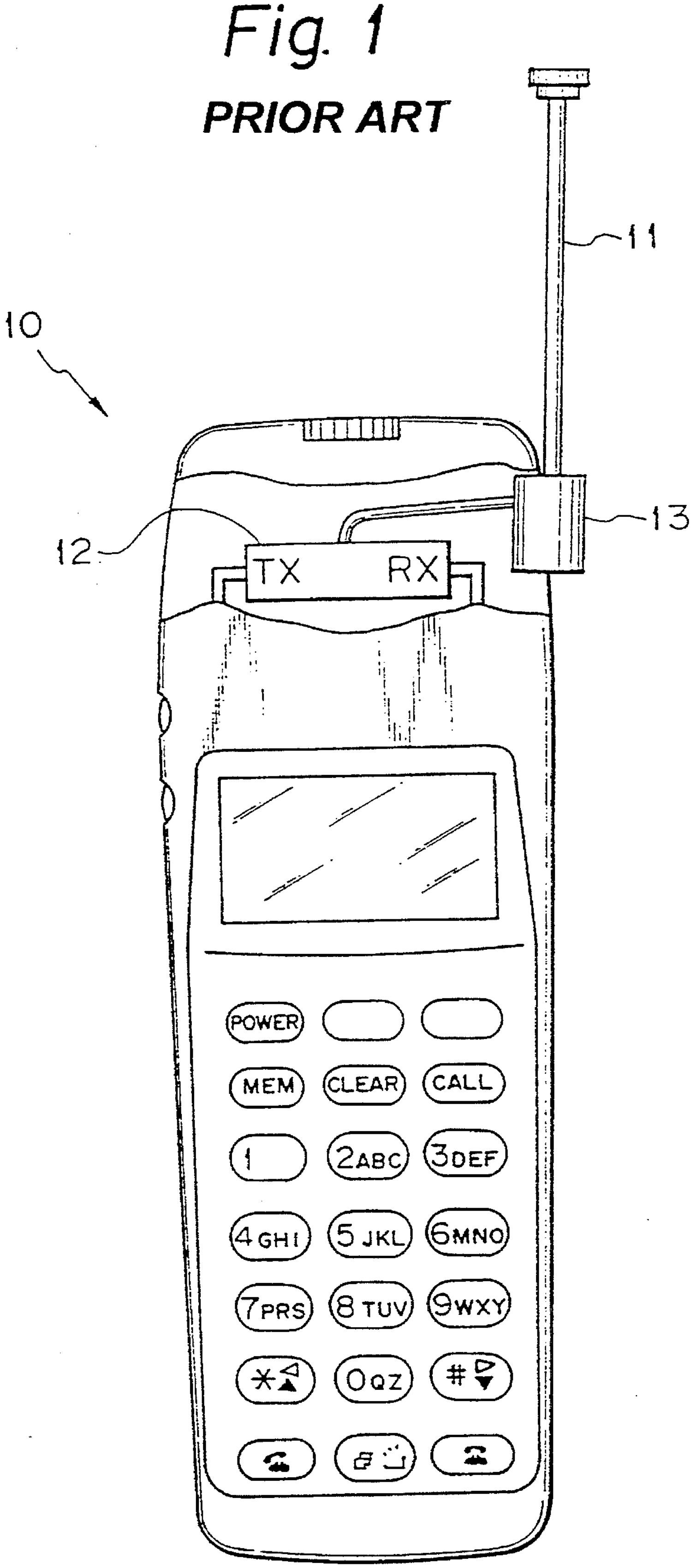
Fig. 1 PRIOR ART
FIG. 1 is a plan view, partially sectioned, showing a conventional radio telephone having a rod-type antenna.

FIG. 1 is a plan view, partially sectioned, showing a conventional radio telephone having a rod-type antenna. In FIG. 1, reference numeral 10 represents a radio telephone set. The radio telephone set 10 is equipped with a rod-type antenna 11 which can be screwed or telescoped into the body of the radio telephone set 10.

Reference numeral 12 denotes a duplexer which contains both a transmission filter and reception filter. The duplexer 12 is connected, via a microstrip line, to the rod antenna via a connector 13 and is connected to both the aforesaid transmitter (TX) and the aforesaid receiver (RX) via microstrip lines.

The portable radio telephone set shown in FIG. 1 suffers from the aforesaid problems. To overcome the problems, the present invention provides the following radio telephone.

Figure 2:
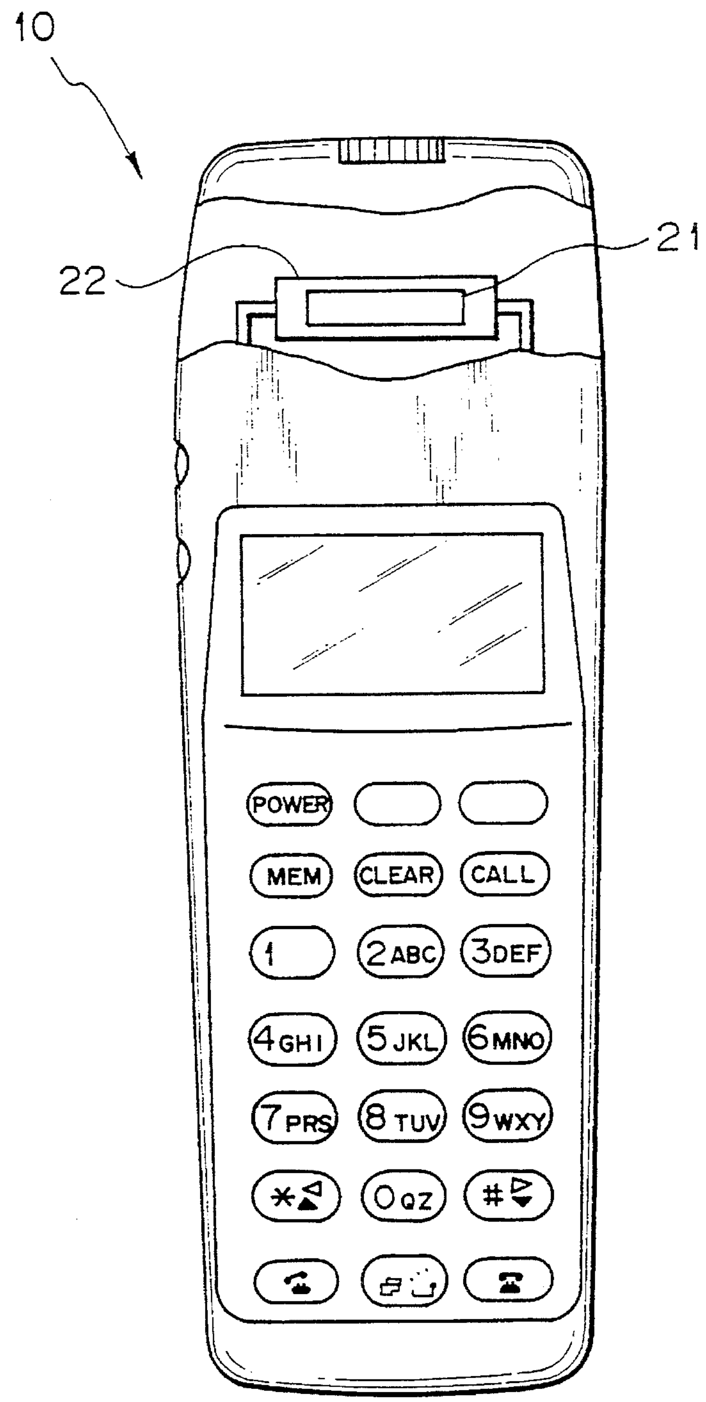
FIG. 2 is a plan view, partially sectioned, showing an embodiment of a radio telephone according to the present invention.

FIG. 2 is a plan view, partially sectioned, showing an embodiment of a radio telephone according to the present invention. As seen from FIG. 2, a special duplexer 22 is employed instead of the conventional duplexer 12 shown in FIG. 1. This enables elimination of the conventional rod-type antenna 11 from the body of the portable radio telephone set 10.

Thus, a radio telephone according to the embodiment has, at least, the antenna and the duplexer mounting both transmission filter and reception filter therein and cooperates with the antenna, wherein the antenna is realized by a microstrip antenna 21 and the microstrip antenna 21 is formed as a cover for sealing the duplexer 22.

Figure 3A:
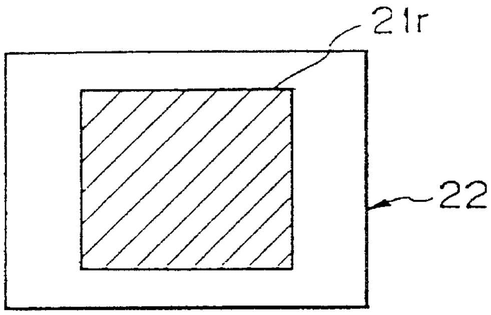
FIGS. 3A, 3B, and 3C illustrate three types of microstrip antennas.
Figure 3B:
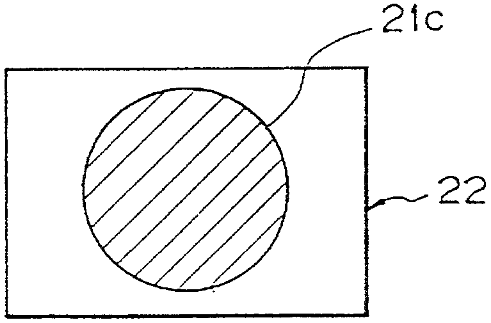
Figure 3C:
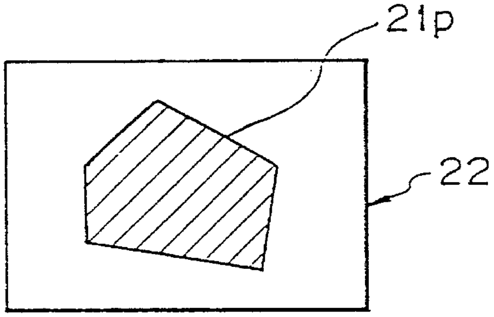

FIGS. 3A, 3B, and 3C illustrate three types of microstrip antennas. In FIG. 3A, a rectangular shaped antenna 21*r* is illustrated. In FIG. 3B, a circular shaped antenna 21*c* is illustrated. In FIG. 3C, a polygonal shaped antenna is illustrated. It should be understood that, in FIGS. 3A, 3B, and 3C, the hatchings do not represent sections as usual but represent microstrip conductor portions.

Figure 4:
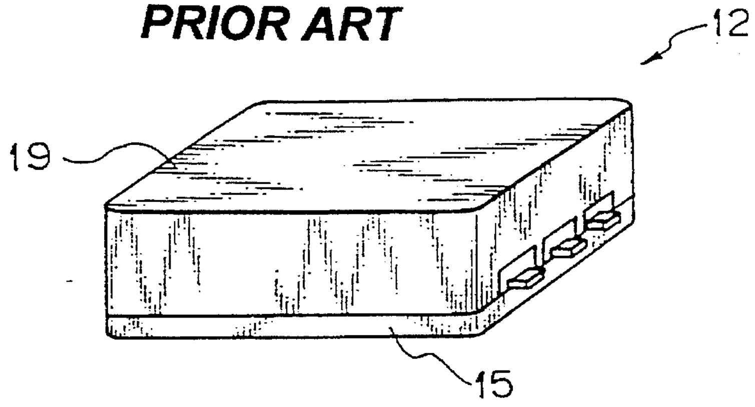
Fig. 4 PRIOR ART
FIG. 4 is a perspective view of an example of a known duplexer.

FIG. 4 is a perspective view of an example of a known duplexer. The duplexer 12 is formed as a box made of a dielectric material. The base of the box is a dielectric substrate 15. The dielectric box is covered by a metal cap 19 for sealing the box.

In the present invention, the metal cap 19 is replaced by a cover acting as a microstrip antenna.

Figure 5:
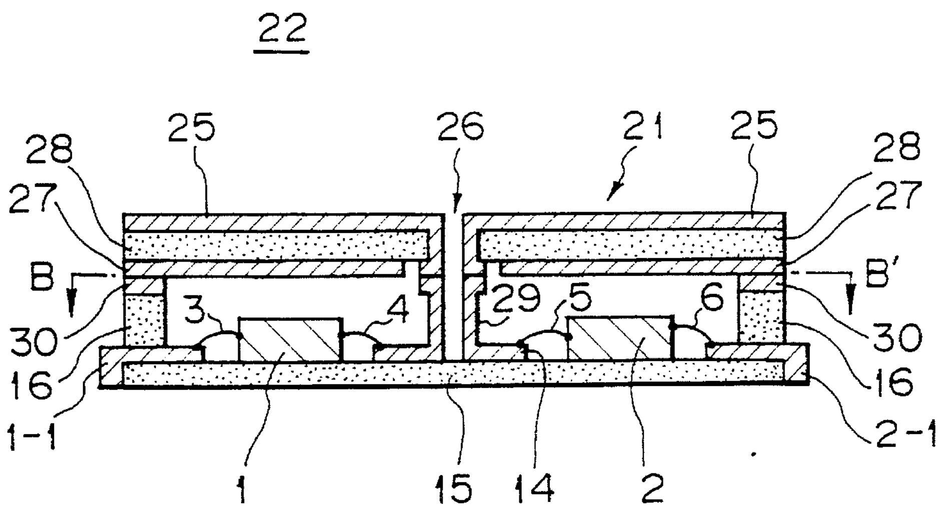
FIG. 5 is a sectional view of an example of a duplexer according to the present invention.

FIG. 5 is a sectional view of an example of a duplexer according to the present invention. In FIG. 5, the aforesaid cover is fabricated as a dielectric substrate 28 on which the microstrip antenna 21 is formed.

The dielectric substrate 28 has, on its upper surface, a specially shaped microstrip conductor 25 and, on its bottom surface, a grounded conductor layer 27. The words "specially shaped" mean the variety of shapes as shown in FIGS. 3A, 3B, and 3C. In the present invention, an expanded rectangular shaped microstrip conductor 25 is preferably used. In other words, the rectangular shaped dielectric substrate 28 is entirely covered by the microstrip conductor 25.

A via hole 26 is formed at the inside part of the specially shaped microstrip conductor 25. The via hole 26 is further electrically connected to a conductive feeder pad 14 which is commonly connected to both the transmission filter 1 and reception filter 2, by way of bonding wires 4 and 5, respectively.

Figure 6:
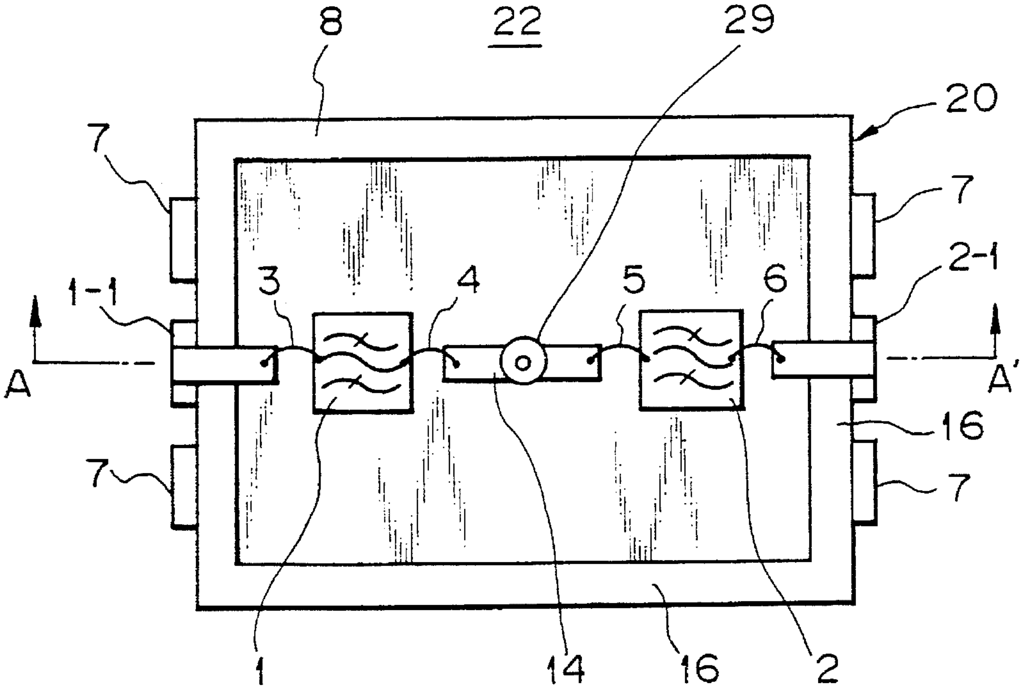
FIG. 6 is a plan view, seen from the arrows B–B' in FIG. 5, showing the duplexer according to the present invention.

FIG. 6 is a plan view, seen from the arrows B–B' in FIG. 5, showing the duplexer according to the present invention. It should be noted that the preceding FIG. 5 is a sectional view of FIG. 6 taken along the arrows A–A', and further, the transmission filter 1 and the reception filter 2 are labelled with symbols indicative of filters.

The via hole 26 and the conductive feeder pad 14 are connected by a conductor stud 29 such that the via hole 26 is sealed by the end of the conductor stud 29.

Figure 7A:
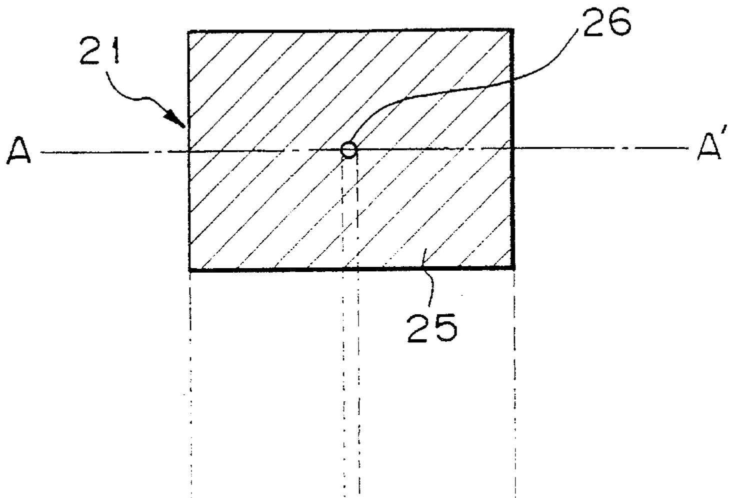
FIGS. 7A, 7B, and 7C are, respectively, a top view, sectional side view, and bottom view of the microstrip antenna shown in FIG. 5.
Figure 7B:
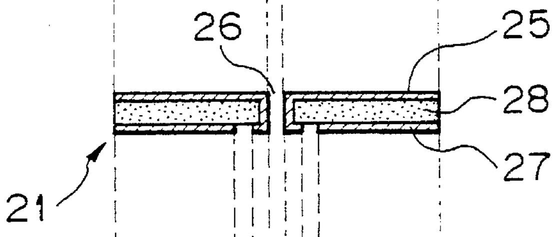
Figure 7C:
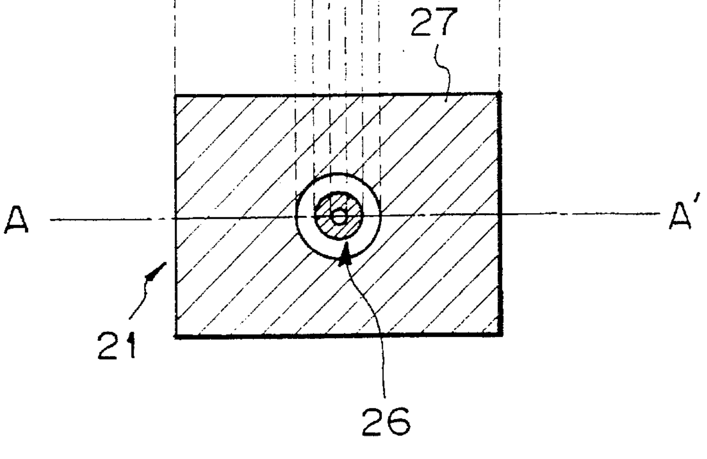

FIGS. 7A, 7B, and 7C are, respectively, a top view, sectional side view, and bottom view of the microstrip antenna shown in FIG. 5. The microstrip antenna 21 can be better clarified with reference to these figures. Note that, in FIGS. 7A and 7C, the hatchings are not used for representing sections as usual, but are for indicating conductive portions in the antenna 21.

The bottom surface (FIG. 7C) is entirely covered by the grounded conductive layer 27 except for the portion where the via hole 26 is opened at the bottom surface.

An open edge 8 of the box-like duplexer 22 (FIG. 6) is covered by a conductive layer 30. The conductive layer 30 is electrically connected to a ground of the duplexer 22. The ground is effective for operating the filters 1 and 2. In FIG. 6, four ground ports 7 are illustrated, which function to make the aforesaid ground of the duplexer the same level with the external ground, i.e., the body of the portable telephone set.

The above-mentioned conductive layer 30 (FIG. 5) on the open edge 8 (FIG. 6) contacts the conductive layer on the bottom surface (FIG. 7C) when the box-like duplexer 20 (FIG. 6) is sealed by the dielectric substrate 28, whereby the related conductive layer on the bottom surface becomes the grounded conductive layer 27.

The duplexer 22 contains the transmission filter 1 and the reception filter 2 therein, both fabricated by surface acoustic wave (SAW) devices.

Figure 8A:
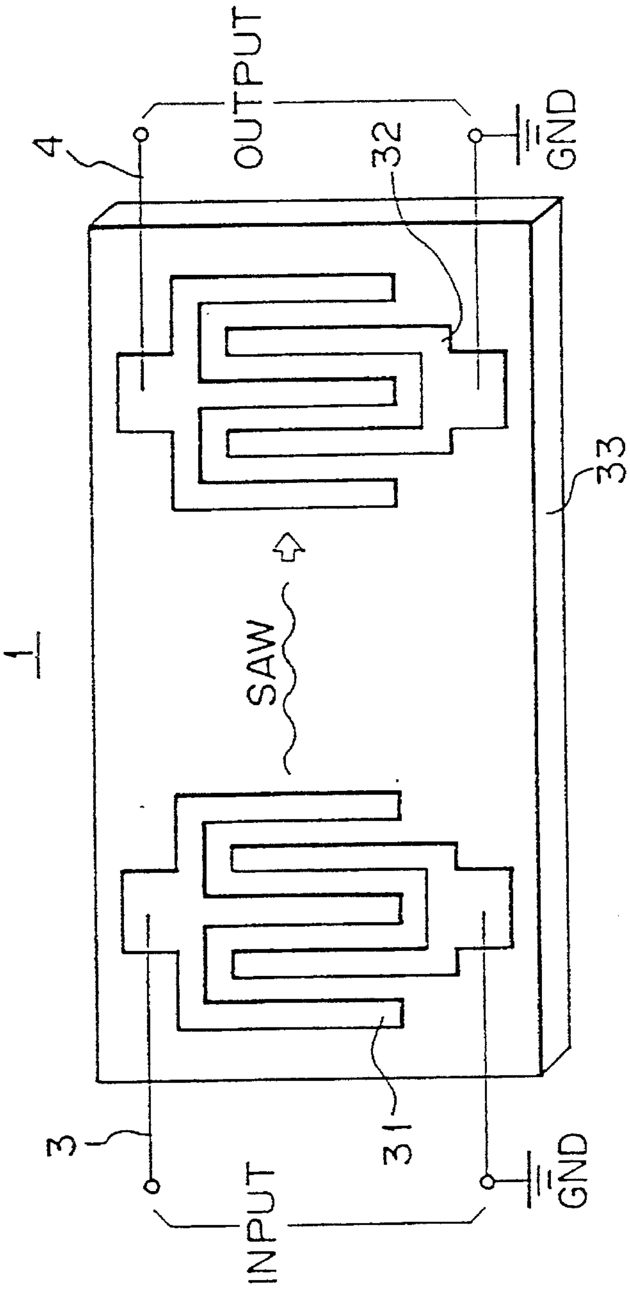
Fig. 8A PRIOR ART
FIG. 8A is a perspective view of a known SAW device.

FIG. 8A is a perspective view of a known SAW device.

Figure 8B:
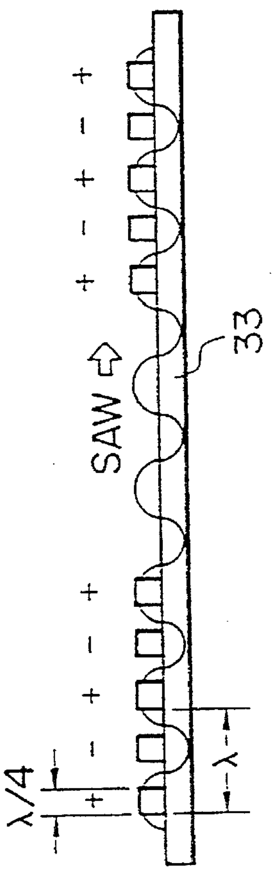
Fig. 8B PRIOR ART
FIG. 8B is an explanatory side view of the SAW device.

FIG. 8B is an explanatory side view of the SAW device. On the surface of a piezoelectric plate 33, an input side comb-like electrode 31 and an output side comb-like electrode 32 are formed. The pitch of the comb is determined to be λ, which is a filtering frequency. Supposing that the SAW device of FIGS. 8A and 8B is used for realizing the transmission filter 1 (FIGS. 5 and 6), a bonding wire 3 is connected to an input port 1-1 (FIGS. 5 and 6). In FIG. 8A, "GND" represents the aforesaid ground. On the other hand, a bonding wire 6 of the reception filter 2 is connected to an output port 2-1 (FIGS. 5 and 6)

Figure 9:
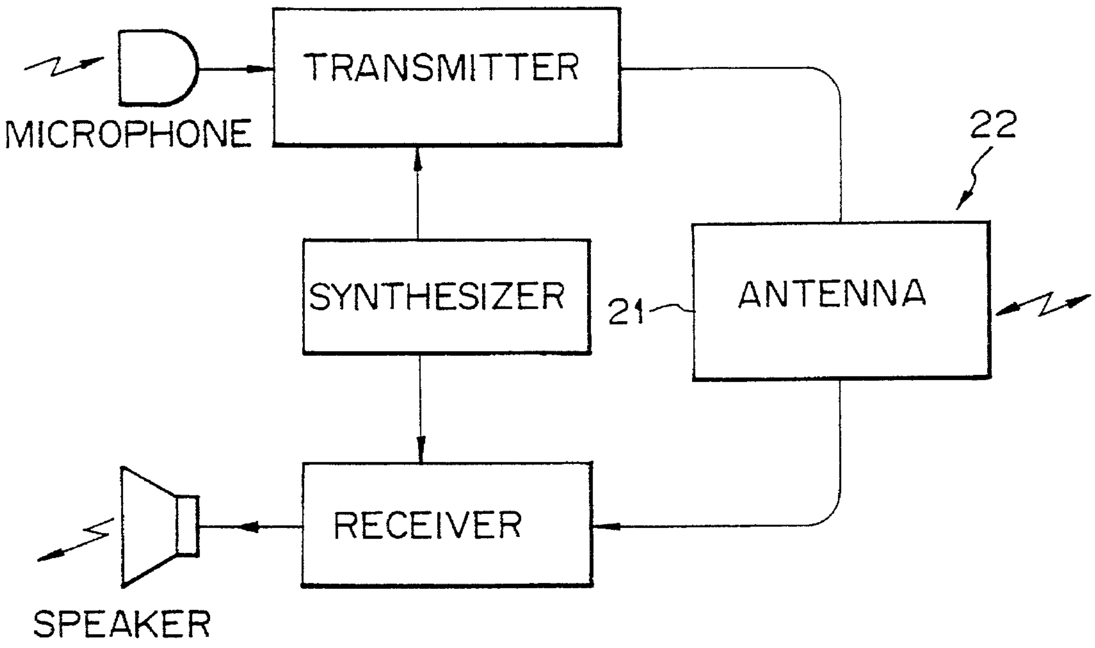
FIG. 9 is a general block diagram of a radio telephone to which the present invention is applied.

FIG. 9 is a general block diagram of a radio telephone to which the present invention is applied. In FIG. 9, the block 22 shows the duplexer fabricated with the microstrip antenna 21. The transmission filter (1) in the duplexer 22 cooperates with a transmitter. The reception filter (2) in the duplexer 22 cooperates with a receiver. The transmitter processes a signal given from a microphone. The receiver processes a signal to be supplied to a speaker. A synthesizer includes a PLL frequency generator, the output of which is applied to mixers (not shown) contained in the transmitter and the receiver, so as to determine a channel of the radio path.

The duplexer 22 of FIG. 9 is comprised of a box-like package (see 20 in FIG. 6) and a cover (21) for sealing the box-like package. The box-like package contains therein SAW devices (refer to FIGS. 8A and 8B) and the cover is fabricated to form the microstrip antenna 21 to be connected to the SAW devices.

As explained above, the present invention incorporates the microstrip antenna into the portable radio telephone set and thus can effectively eliminate the conventional rod-type antenna.

I claim:

1. A radio telephone having, at least, an antenna and a duplexer mounting both a transmission filter and reception filter therein and cooperating with the antenna, wherein said antenna is a microstrip antenna which is on a cover for said duplexer, said duplexer being formed as a box made of a dielectric material, and said cover being fabricated as a dielectric substrate on which the microstrip antenna is formed, said dielectric substrate having, on its upper surface, a specially shaped microstrip conductor and, on its bottom surface, a grounded conductor layer, and a generally circular open via hole of predetermined inner diameter being integrally formed at the inner part of said specially shaped microstrip conductor, said conductor being electrically connected by a conductor stud formed as a hollow shape having said predetermined inner diameter at said open via hole to a conductive feeder pad commonly connected to both said transmission filter and said reception filter.

2. A radio telephone as set forth in claim 1, wherein said specially shaped microstrip conductor and said conductive feeder pad are connected at said open via hole by said conductor stud, said conductor stud forming part of said open via hole and an inner surface of said conductor stud being flush with an inner surface of said feeder pad, such that the via hole is sealed by the end of said conductor stud.

3. A radio telephone as set forth in claim 1, wherein said bottom surface is entirely covered by said grounded conductive layer except for the portion where said via hole is opened at the bottom surface.

4. A radio telephone as set forth in claim 3, wherein an edge of said box-like duplexer is covered by a conductive layer which is electrically connected to a ground of the duplexer, which conductive layer on said edge contacts said conductive layer on said bottom surface when the box-like duplexer is sealed by said dielectric substrate, whereby the related conductive layer on the bottom surface becomes said grounded conductive layer.

5. A radio telephone as set forth in claim 1, wherein said specially shaped microstrip conductor is shaped rectangularly, circularly, or polygonally.

6. A radio telephone as set forth in claim 1, wherein said duplexer contains the transmission filter and reception filter therein, both fabricated by surface acoustic wave (SAW) devices.

* * * * *